US008705563B2

(12) United States Patent
Wang et al.

(10) Patent No.: US 8,705,563 B2
(45) Date of Patent: Apr. 22, 2014

(54) METHOD, COMBINER AND SYSTEM FOR TRANSMITTING SIGNALS

(75) Inventors: Pingjing Wang, Shenzhen (CN); Wei Zheng, Shenzhen (CN); Jian Shen, Shenzhen (CN); Jianjun Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/529,956

(22) Filed: Jun. 21, 2012

(65) Prior Publication Data

US 2012/0257632 A1 Oct. 11, 2012

Related U.S. Application Data

(63) Continuation of application No. PCT/CN2010/080640, filed on Dec. 31, 2010.

(51) Int. Cl.
*H04J 3/16* (2006.01)
(52) U.S. Cl.
USPC ......... 370/465; 370/466; 455/562.1; 455/561
(58) Field of Classification Search
USPC .......... 370/310, 329, 330, 465, 466; 455/561, 455/562.1, 523, 268; 342/359
See application file for complete search history.

(56) References Cited

U.S. PATENT DOCUMENTS

| 7,466,990 | B2 * | 12/2008 | Mellor et al. | 455/523 |
| 8,164,520 | B2 * | 4/2012 | Raeder et al. | 342/359 |
| 2002/0132644 | A1 | 9/2002 | Mellor | |
| 2004/0152492 | A1 * | 8/2004 | Gray | 455/562.1 |
| 2008/0291116 | A1 * | 11/2008 | Le et al. | 343/907 |
| 2010/0113097 | A1 | 5/2010 | Seeor | |
| 2010/0261437 | A1 | 10/2010 | Behzad et al. | |
| 2011/0116793 | A1 | 5/2011 | Zhang et al. | |

FOREIGN PATENT DOCUMENTS

| CN | 1617530 A | 5/2005 |
| CN | 101437178 A | 5/2009 |
| CN | 101635867 A | 1/2010 |

OTHER PUBLICATIONS

3GPP, "3rd Generation Partnership Project: Technical Specification Group Radio Access Network; UTRAN Iuant interface: Signalling transport (Release 9)", Dec. 2009, 3GPP TS 25.462 V9.0.0, Posted on Dec. 17, 2009.*
Written opinion issued in corresponding PCT patent application No. PCT/CN2010/080640, dated Oct. 20, 2010, and English translation thereof, 8 pages total.
Search report issued in corresponding EP application No. 10852450.5, dated Oct. 1, 2012, total 7 pages.
International search report for International application No. PCT/CN2010/080640, dated Oct. 20, 2011, total 3 pages.

(Continued)

*Primary Examiner* — Brian O'Connor
(74) *Attorney, Agent, or Firm* — Staas & Halsey LLP

(57) ABSTRACT

Methods and apparatus are provided for receiving AISG protocol signals sent by one or more local devices and adding corresponding labels to the AISG protocol signals, where the labels are used to identify mapping relationships between the local devices that send the AISG protocol signals and peer devices. The AISG protocol signals to which the labels have been added are packed into data packet and sent to a peer combiner through a shared feeder. The peer combiner unpacks the data packet and sends the AISG protocol signals to corresponding peer devices according to the labels added to the AISG protocol signals.

19 Claims, 7 Drawing Sheets

(56) References Cited

OTHER PUBLICATIONS

Antenna Interface Standards Group Standard No. AISG1: Issue 1.1: "Control interface for antenna line devices", dated Jul. 30, 2004, total 56 pages.

Antenna Interface Standards Group Standard No. AISG v2.0: "Control interface for antenna line devices", dated Jun. 13, 2006, total 41 pages.

AISG Extension: Remote Azimuth Beamwidth Standard No. AISG-ES-RAB v2.1.0, dated Dec. 11, 2007, total 21 pages.

AISG Extension: Remote Azimuth Steering Standard No. AISG-ES-RAS v2.1.0, dated Dec. 11, 2007, total 20 pages.

Office action issued in corresponding Chinese application No. 201080004892.2, dated Dec. 27, 2012, and English translation thereof, total 9 pages.

* cited by examiner

METHOD, COMBINER AND SYSTEM FOR TRANSMITTING SIGNALS

CROSS-REFERENCE TO RELATED APPLICATIONS

This application is a continuation of International Application No. PCT/CN2010/080640, filed on Dec. 31, 2010, which is hereby incorporated by reference in its entirety.

FIELD OF THE INVENTION

The present invention relates to the field of communications technologies, and in particular, to method and apparatus for processing antenna interface standards group (AISG) protocol signals sent by one or more local devices.

BACKGROUND OF THE INVENTION

A combiner is capable of implementing antenna feeder sharing between different band systems. Therefore, in an application scenario in which multiple band systems share a base station, considering factors such as feeder cost, labor cost and site lease cost, a combiner is usually adopted to reduce the cost. Moreover, with the widespread market application of 3G, the demands for combiners are increasing.

In the prior art, in a scenario with an RET antenna or an AISG (Antenna Interface Standards Group) tower mounted amplifier, when the combiner is adopted to send AISG protocol signals, the base station side and the antenna side each are set with a combiner, and the AISG protocol signals between different base stations and devices at the antenna side adopt different feeders for transmission.

The prior art at least has the following problems.

In the prior art, when AISG protocol signals are transmitted, the AISG protocol signals between different base stations and devices at the antenna side adopt different feeders for transmission. Therefore, the number of used feeders is large, resulting in high feeder cost and low efficiency of transmitting the AISG protocol signals.

SUMMARY OF THE INVENTION

In order to reduce the feeder cost and improve the efficiency of transmitting AISG protocol signals at the same time, the present invention provide a method, a combiner and a system for transmitting signals. The technical solutions are as follows:

According to a first aspect, a method for transmitting signals is provided, where the method includes:
  receiving antenna interface standards group (AISG) protocol signals sent by one or more local devices and adding corresponding labels to the AISG protocol signals, the labels identifying mapping relationships between the local devices that send the AISG protocol signals and peer devices;
  packing the AISG protocol signals to which the labels are added into a data packet and sending the data packet to a peer combiner through a shared feeder, the peer combiner unpacking the data packet and sending the AISG protocol signals to the corresponding peer devices according to the labels added to the AISG protocol signals. As used throughout this specification, the term "peer" refers to a relationship between two or more devices or elements that enables an exchange of information or data, such as signals, directly or indirectly, between the peer devices or elements.

In a first implementation form according to the first aspect, the method further comprises:
  demodulating the received AISG protocol signals sent by the one or more local devices to obtain demodulated AISG protocol signals;
  wherein adding the corresponding labels to the AISG protocol signals comprises:
  adding the corresponding labels to the demodulated AISG protocol signals.

In a second possible implementation form according to the first aspect, the method further comprises:
  modulating the data packet to obtain a modulated data packet;
  wherein sending the data packet to the peer combiner through the shared feeder comprises:
  sending the modulated data packet to the peer combiner through the shared feeder.

In a third possible implementation form according to the first aspect, further comprising:
  receiving a data packet sent by the peer combiner, wherein the data packet carries AISG protocol signals to which labels are added, the labels identifying mapping relationships between peer devices that send the AISG protocol signals and local devices;
  unpacking the received data packet to obtain the AISG protocol signals to which the labels are added; and
  sending the AISG protocol signals to the corresponding local devices according to the labels added to the AISG protocol signals.

In a fourth possible implementation form according to the first aspect, the method further comprises:
  demodulating the received data packet to obtain a demodulated data packet;
  wherein unpacking the received data packet comprises:
  unpacking the demodulated data packet to obtain the AISG protocol signals to which the labels are added.

In a fifth possible implementation form according to the first aspect, the method further comprises:
  modulating the AISG protocol signals to which the labels are added to obtain modulated AISG protocol signals;
  wherein sending the AISG protocol signals to the corresponding local devices according to the labels added to the AISG protocol signals comprises:
  sending the modulated AISG protocol signals to the corresponding local devices according to the labels added to the AISG protocol signals.

According to a second aspect, a combiner is provided, where the combiner includes:
  a first receiving module, configured to receive antenna interface standards group (AISG) protocol signals sent by one or more local devices;
  an adding module, configured to add corresponding labels to the AISG protocol signals received by the first receiving module, the labels identifying mapping relationships between the local devices that send the AISG protocol signals and peer devices;
  a packing module, configured to pack the AISG protocol signals, to which the labels are added by the adding module, into a data packet; and
  a first sending module, configured to configured to send the data packet derived from packing by the packing module to a peer combiner through a shared feeder, the peer combiner unpacking the data packet and sending the AISG protocol signals to the corresponding peer devices according to the labels added to the AISG protocol signals.

In a first implementation form according to the second aspect, the combiner further comprises:

a first demodulation module, configured to demodulate the AISG protocol signals sent by the one or more local devices and received by the first receiving module to obtain demodulated AISG protocol signals;

wherein the adding module is configured to add the corresponding labels to the demodulated AISG protocol signals obtained by the first demodulation module.

In a second implementation form according to the second aspect, the combiner further comprises:

a first modulation module, configured to modulate the data packet to obtain a modulated data packet; and wherein the first sending module is configured to send the modulated data packet obtained by the first modulation module to the peer combiner through the shared feeder.

In a third implementation form according to the second aspect, the combiner further comprises:

a second receiving module, configured to receive a data packet sent by the peer combiner, wherein the data packet carries AISG protocol signals to which labels are added, the labels identifying mapping relationships between peer devices that send the AISG protocol signals and local devices;

an unpacking module, configured to unpack the data packet received by the second receiving module to obtain the AISG protocol signals to which the labels are added; and a second sending module, configured to send the AISG protocol signals obtained by the unpacking module to the corresponding local devices according to the labels added to the AISG protocol signals.

In a fourth possible implementation form according to the second aspect, the combiner further comprises:

a second demodulation module, configured to demodulate the data packet received by the second receiving module to obtain a demodulated data packet;

wherein the unpacking module is configured to unpack the demodulated data packet obtained by the second demodulation module to obtain the AISG protocol signals to which the labels are added.

In a fifth possible implementation form according to the second aspect, the combiner further comprises:

a second modulation module, configured to modulate the AISG protocol signals to which the labels are added to obtain modulated AISG protocol signals;

wherein the second sending module is configured to send the modulated AISG protocol signals obtained by the second modulation module to the corresponding local devices according to the labels added to the AISG protocol signals.

According to a third aspect, a system for transmitting signals is further provided, the system includes: a first combiner and a second combiner, wherein the first combiner is configured to receive antenna interface standards group (AISG) protocol signals sent by one or more local devices and add corresponding labels to the AISG protocol signals, the labels identifying mapping relationships between the local devices that send the AISG protocol signals and peer devices and to pack the AISG protocol signals to which the labels are added into a data packet, and send the data packet through a shared feeder; and the second combiner is configured to receive and unpack the data packet, and send the AISG protocol signals to the corresponding peer devices according to the labels added to the AISG protocol signals.

The beneficial effects of the technical solutions according to the embodiments of the present invention are as follows:

By adding corresponding labels to received AISG protocol signals sent by one or more local devices and sending the AISG protocol signals to a peer combiner through a shared feeder, the labels added to the AISG protocol signals can be used to identify mapping relationships between the local devices that send the AISG protocol signals and peer devices. Thus, the peer combiner can be enabled to send the AISG protocol signals to corresponding peer devices according to the labels added to the AISG protocol signals, so that the feeder cost is reduced and the efficiency of transmitting the AISG protocol signals is improved.

BRIEF DESCRIPTION OF THE DRAWINGS

Embodiments of the present invention are described in conjunction with the accompanying drawings.

DETAILED DESCRIPTION OF THE EMBODIMENTS

Further aspects and advantages of the invention are described in detail in connection with embodiments read in connection with reference to the accompanying drawings.

Embodiment 1

Figure 1:
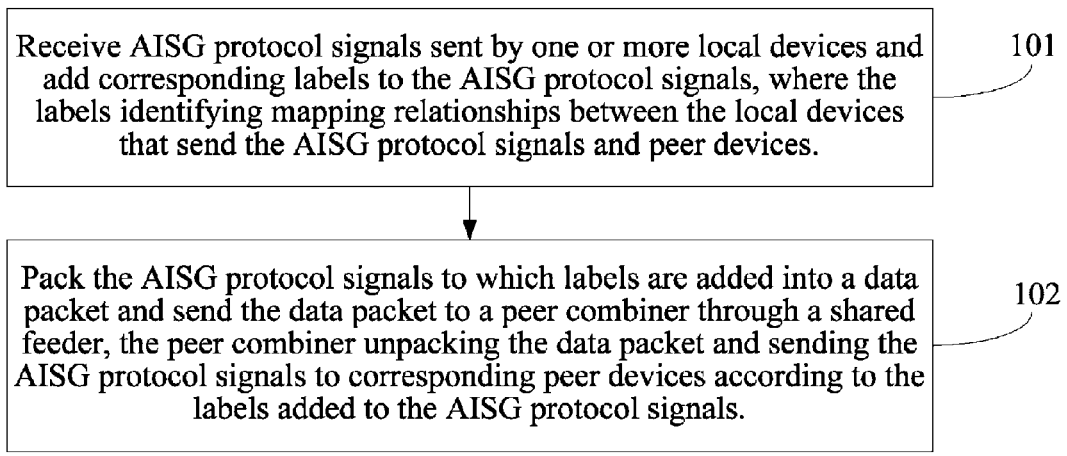
FIG. 1 is a flow chart of a method for transmitting signals according to an embodiment of the present invention.

Referring to FIG. 1, the embodiment provides a method for transmitting signals, where the method includes the following steps.

101: Receive AISG protocol signals sent by one or more local devices and add corresponding labels to the AISG protocol signals, the labels identifying mapping relationships between the local devices that send the AISG protocol signals and peer devices. As used throughout this specification, the term "peer" refers to a relationship between two or more devices or elements that enables an exchange of information or data, such as signals, directly or indirectly, between the peer devices or elements.

102: Pack the AISG protocol signals to which the labels are added into a data packet and send the data packet to a peer combiner through a shared feeder, the peer combiner unpacking the data packet and sending the AISG protocol signals to corresponding peer devices according to the labels added to the AISG protocol signals.

Before the adding the corresponding labels to the AISG protocol signals, the method further includes:

demodulating the received AISG protocol signals sent by one or more local devices, to obtain demodulated AISG protocol signals.

Addition of the corresponding labels to the AISG protocol signals includes:

adding the corresponding labels to the demodulated AISG protocol signals.

Before the sending the data packet to the peer combiner through the shared feeder, the method can optionally include:

modulating the data packet to obtain a modulated data packet.

The sending the data packet to the peer combiner through the shared feeder specifically includes:

sending the modulated data packet to the peer combiner through the shared feeder.

The method may further include:

receiving a data packet sent by the peer combiner, where the data packet carries the AISG protocol signals to which the labels are added, the labels identifying the mapping relationships between the peer devices that send the AISG protocol signals and the local devices; and unpacking the received data packet to obtain the AISG protocol signals to which the labels are added, and sending the AISG protocol signals to corresponding local devices according to the labels added to the AISG protocol signals.

Before the unpacking the received data packet, the method can optionally include:

demodulating the received data packet to obtain a demodulated data packet.

Unpacking the received data packet includes:

unpacking the demodulated data packet to obtain the AISG protocol signals to which the labels are added.

Before the sending the AISG protocol signals to the corresponding local devices according to the labels added to the AISG protocol signals, the method may further include:

modulating the AISG protocol signals to which the labels are added, to obtain modulated AISG protocol signals.

Sending the AISG protocol signals to the corresponding local devices according to the labels added to the AISG protocol signals can include:

sending the modulated AISG protocol signals to the corresponding local devices according to the labels added to the AISG protocol signals.

Corresponding labels can be added to received AISG protocol signals sent by one or more local devices, and the AISG protocol signals can be sent to a peer combiner through a shared feeder. Labels added to the AISG protocol signals can be used to identify mapping relationships between the local devices that send the AISG protocol signals and peer devices. The peer combiner can be enabled to send the AISG protocol signals to corresponding peer devices according to the labels added to the AISG protocol signals, so that the feeder cost is reduced and the efficiency of transmitting the AISG protocol signals is improved.

Embodiment 2

This embodiment provides a method for transmitting signals. The method adopts a mode of transmitting AISG protocol signals through a shared feeder in order to reduce the feeder cost and improve the efficiency of transmitting AISG protocol signals. In addition, to distinguish AISG protocol signals sent by different devices, the method provided by this embodiment adopts a mode of adding a label to each AISG protocol signal. For ease of description, the embodiment 2 uses the network structure shown in FIG. 2 as an example.

Figure 2:
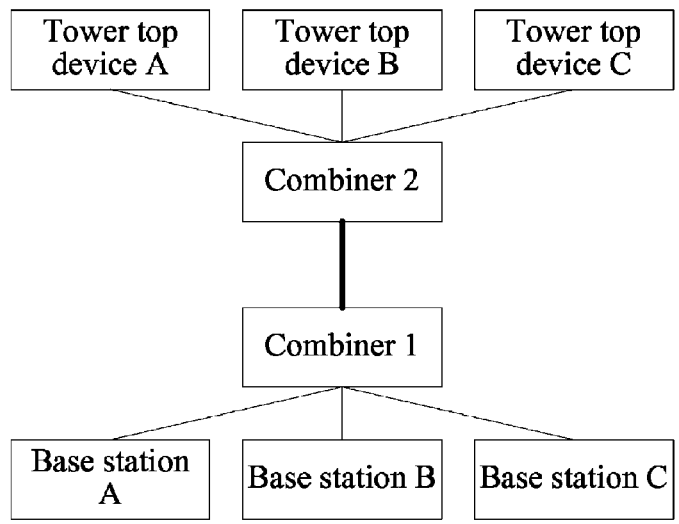
FIG. 2 is a schematic diagram of a network structure according to another embodiment of the present invention.

In FIG. 2, a combiner 1 provided at a base station side, is configured to combine AISG protocol signals sent by a base station A, a base station B and a base station C into signals of a route and send the signals of a route to a combiner 2, and the combiner 1 is further configured to unpack signals of a route, which is sent by the combiner 2, to corresponding one or more AISG protocol signals and send the AISG protocol signals to the corresponding base station A, base station B or base station C. The combiner 2 is provided at an antenna side and is configured to combine AISG protocol signals sent by a tower top device A, a tower top device B and a tower top device C into signals of a route and send the signals of a route to the combiner 1, and the combiner 2 is further configured to unpack the signals of a route, which is sent by the combiner 1, to corresponding one or more AISG protocol signals and send the AISG protocol signals to the corresponding tower top device A, tower top device B or tower top device C. The combiner 1 is the peer combiner of the combiner 2, the combiner 2 is the peer combiner of the combiner 1, and signals transmission between the combiner 1 and the combiner 2 through a shared feeder. In addition, one-to-one relationships exist between the tower top devices and the base stations. In FIG. 2, the base station A corresponds to the tower top device A, the base station B corresponds to the tower top device B and the base station C corresponds to the tower top device C. The tower top devices include, but are not limited to, an RCU (Remote Control Unit, remote control unit) and a TMA (Tower Mounted Amplifier, tower mounted amplifier), which are not limited in the embodiment.

With reference to the network structure shown in FIG. 2, an example is given to describe the method provided by the embodiment in detail, in which a combiner 1 at a base station side receives AISG protocol signals sent by one or more base stations and sends the AISG protocol signals to corresponding tower top devices. The AISG protocol signals sent by the base stations are AISG protocol analog signals, which are also called OOK (On Off Keying) signals.

Figure 3:
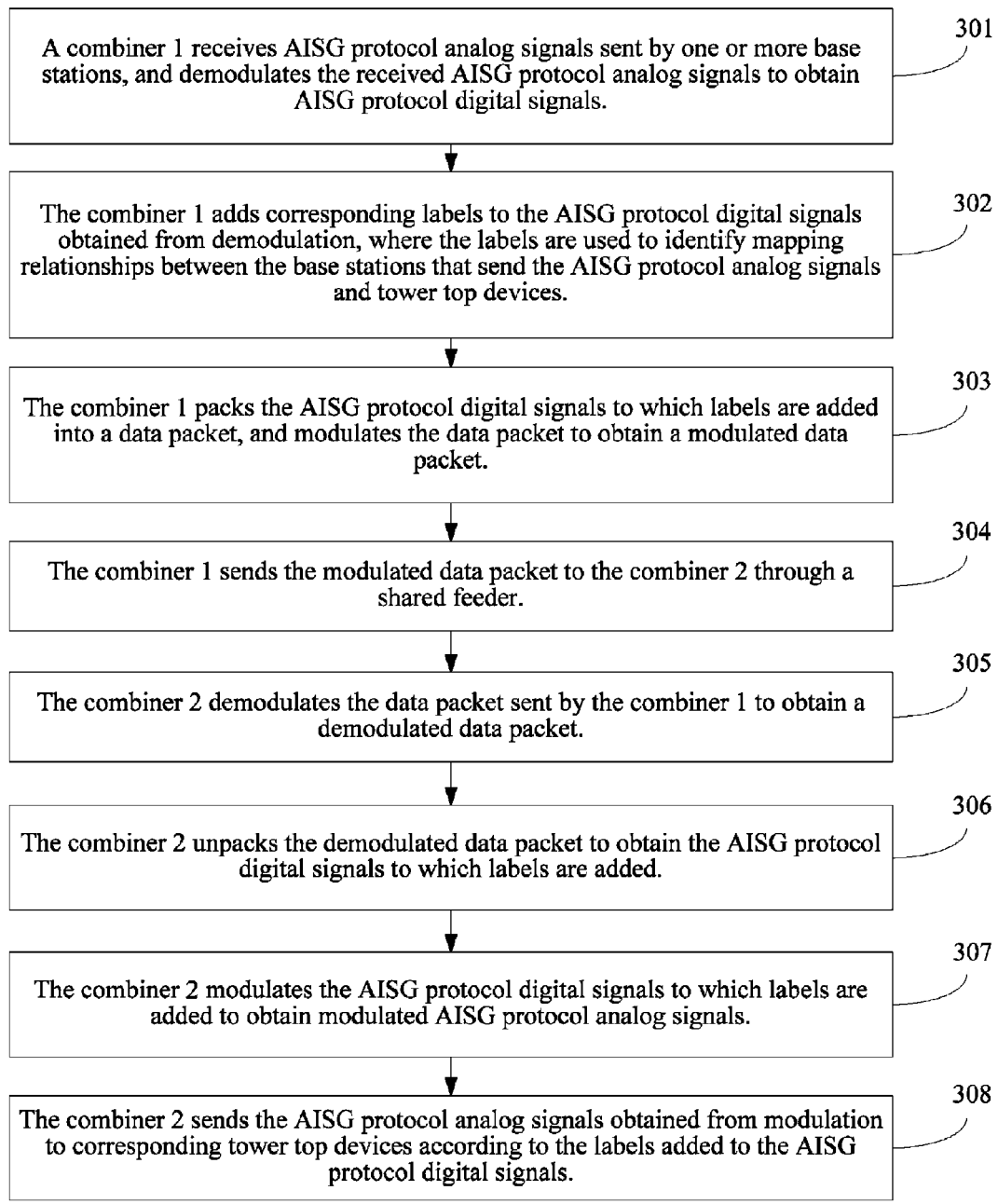
FIG. 3 is a flow chart of a method for transmitting signals according to the embodiment of FIG. 2.

Referring to FIG. 3, the method provided by the embodiment includes the following steps.

301: A combiner 1 receives AISG protocol analog signals sent by one or more base stations, and demodulates the received AISG protocol analog signals to obtain AISG protocol digital signals.

In this step, no matter which base station, a base station A, a base station B or a base station C, the base station sends an AISG protocol analog signal. When the combiner 1 receives AISG protocol analog signals sent by each base station, the combiner 1 demodulates the received AISG protocol analog signals to obtain AISG protocol digital signals. The process of demodulating a communication signal is the process of converting an analog signal into a digital signal. The detailed demodulation method used in this embodiment is not limited to any specific demodulation scheme. During specific implementation, after filtering processing is performed on the AISG protocol analog signals, the signals are amplified by a two-stage inverting gain-of-15 proportional amplifier, and then an envelope detector detects a carrier envelope. Original data information is derived from comparison with a threshold voltage, that is, AISG protocol digital signals are obtained. A high electrical level demodulated by the envelope may correspond to a logical "0", a low electrical level may correspond to a logical "1" and the envelope detector may be an RC (Resistance Capacitance) low-pass filter, which are not limited in the embodiment.

302: The combiner 1 adds corresponding labels to the AISG protocol digital signals derived from demodulation, where the labels are used to identify mapping relationships between the base stations that send the AISG protocol analog signals and tower top devices.

Specifically, when corresponding labels are added to the AISG protocol digital signals derived from demodulation, the added labels may be the labels of the base stations that send the AISG protocol analog signals. For example, after an AISG protocol analog signal sent by the base station A is demodulated, the label of the base station A is added to the AISG protocol digital signal derived from demodulation; after an AISG protocol analog signal sent by the base station B is demodulated, the label of the base station B is added to the AISG protocol digital signal derived from demodulation; after an AISG protocol analog signal sent by the base station C is demodulated, the label of the base station C is added to the AISG protocol digital signal derived from demodulation. In this way, because one-to-one relationships exist between the base stations and the tower top devices, even if the AISG protocol analog signals sent by all base stations are transmitted through a shared feeder, the AISG protocol analog signals sent by the stations can still be distinguished. Therefore, the AISG protocol digital signals can be sent to corresponding tower top devices according to the labels of the base stations added to the AISG protocol digital signals derived from demodulation of the AISG protocol analog signals.

The labels may be base station identifiers, identification codes negotiated between the combiner 1 and the combiner 2, or other identification modes. The detailed formats of the added labels are not limited in the embodiment, as long as the combiner is enabled to send the AISG protocol digital signals to corresponding tower top devices according to the labels added to the AISG protocol digital signals derived from demodulation. Multiple methods for adding labels exist. For example, a label field is added to an AISG protocol digital signal derived from demodulation, or another method of carrying a label is adopted, which is not limited in the embodiment.

Further, if the combiner 1 receives a large number of AISG protocol analog signals, after demodulation of the AISG protocol analog signals, the combiner 1 may cache the AISG protocol digital signals derived from demodulation, and then add corresponding labels to the AISG protocol digital signals according to a receiving sequence or another sequence.

303: The combiner 1 packs the AISG protocol digital signals to which the labels are added into a data packet, and modulates the data packet to obtain a modulated data packet.

In this step, the AISG protocol signals between all base stations and all tower top devices are transmitted through a shared feeder. Therefore, in order to improve the transmission efficiency, the method provided by the embodiment adopts a mode of packing multiple AISG protocol digital signals into a data packet and sending the data packet. During packing, a time period may be preset as a packing period. For example, the signals are packed every one second or every three seconds. However, the embodiment is not limited to a specific preset time period. Because different base stations (especially base stations of different manufacturers) may use different baud rates to send AISG protocol analog signals, the number of AISG protocol analog signals received by a combiner within each preset time period may be different, and as a result, the number of AISG protocol digital signals is different when a combiner performs packing The number of AISG protocol digital signals during each packing is not limited in the embodiment.

In addition, because the AISG protocol digital signals to which labels are added are still digital signals, signals included in the data packet derived from packing are all digital signals. As low-rate digital signals cannot be transmitted over a long distance, the digital signals can be modulated to a carrier with a higher carrier frequency for transmission. It is currently stipulated in an AISG protocol that, the modulation frequency of a single AISG signal is 2.176 MHz. The data packet derived by packing multiple AISG protocol digital signals is modulated to a carrier with a higher frequency for transmission. The process of modulating a communication signal is the process of converting a digital signal into an analog signal. When a data packet is modulated, a modulation method is not limited in the embodiment. During specific implementation, according to the requirement of the AISG protocol, original data information is modulated in an OOK mode. That is, a logical "1" carrier is off and a logical "0" carrier is on. Due to a low frequency, the off and on of a carrier can be implemented by passing the AISG protocol digital signals through an AND gate, and then the AISG protocol digital signals are amplified and filtered after passing through the AND gate, to obtain OOK signals, that is, AISG protocol analog signals.

304: The combiner 1 sends the modulated data packet to the combiner 2 through a shared feeder.

All the AISG protocol digital signals included in the modulated data packet carry corresponding labels.

305: The combiner 2 demodulates the data packet sent by the combiner 1, to obtain a demodulated data packet.

In this step, the combiner 2 may adopt the same demodulation method used by the combiner 1 in the foregoing step 301 to demodulate the received data packet, which is not limited in the embodiment. All the signals included in the demodulated data packet are digital signals.

306: The combiner 2 unpacks the demodulated data packet to obtain the AISG protocol digital signals to which labels are added.

307: The combiner 2 modulates the AISG protocol digital signals to which labels are added, to obtain AISG protocol analog signals after the modulation.

Specifically, after the AISG protocol digital signals to which labels are added are obtained through the unpacking in the foregoing step 306, if the number of the AISG protocol digital signals is large, when modulation is performed on each AISG protocol digital signal, each AISG protocol digital signal derived from unpacking is cached, and then modulated according to a prescribed sequence, to obtain the AISG protocol analog signals after the modulation.

308: The combiner 2 sends the AISG protocol analog signals obtained from modulation to corresponding tower top devices according to the labels added to the AISG protocol digital signals.

In this step, because a label is added to each AISG protocol digital signal and one-to-one relationships exist between the base stations and the tower top devices, where the labels are used to identify mapping relationships between the base stations that send the AISG protocol analog signals and the tower top devices, no matter the number of AISG protocol digital signals received by the combiner 2 is one or multiple, according to the labels added to the AISG protocol digital signals, the combiner 2 is enabled to send the AISG protocol analog signals obtained from modulation to corresponding tower top devices. For example, a label in one AISG protocol digital signal obtained from demodulation is the label of the base station A, and a mapping relationship exists between the base station A and the tower top device A. Therefore, according to the label of the base station A, the combiner 2 may modulate the AISG protocol digital signal to which the label of the base station A is added, and send the modulated signal to the corresponding tower top device A.

It should be noted that, through the foregoing step 301 to step 308, the embodiment takes the process of transmitting AISG protocol analog signals from the base station side to the antenna side as an example to describe the method for transmitting antenna interface standards group protocol signals according to the embodiment in detail. During practical application, the AISG protocol analog signals may also be transmitted from the antenna side to the base station side. The transmission process is similar to the process of transmitting the AISG protocol analog signals from the base station side to the antenna side, and the principles are the same, which are not described in detail herein. In general, a same combiner may not only receive AISG protocol analog signals sent by local devices, but also may receive AISG protocol analog signals sent by peer devices. No matter a combiner at the base station side or a combiner at the antenna side, after the combiner receives AISG protocol analog signals sent by local devices, the combiner may send the AISG protocol analog signals to a peer combiner according to the processing mode of the combiner 1 in the foregoing steps, and after a data packet sent by the peer combiner is received, the combiner may send the data packet to corresponding local devices according to the processing mode of the combiner 2 in the foregoing steps. Because the AISG protocol analog signals between the base stations and the tower top devices are transmitted through one shared feeder, and one or more AISG protocol analog signals may be transmitted at one time, the feeder cost is reduced and the transmission efficiency is improved.

For the method according to the embodiment, received AISG protocol analog signals sent by one or more local devices are demodulated, corresponding labels are added to the AISG protocol digital signals derived from demodulation, the AISG protocol digital signals are sent to a peer combiner through a shared feeder, and because the labels added to the AISG protocol digital signals are used to identify mapping relationships between base stations that send the AISG protocol analog signals and tower top devices, the peer combiner is enabled to modulate the AISG protocol digital signals according to the labels added to the AISG protocol digital signals and send the modulated signals to corresponding peer devices, so that the feeder cost can be reduced and the efficiency of transmitting AISG protocol signals can also be improved.

Embodiment 3

Figure 4:
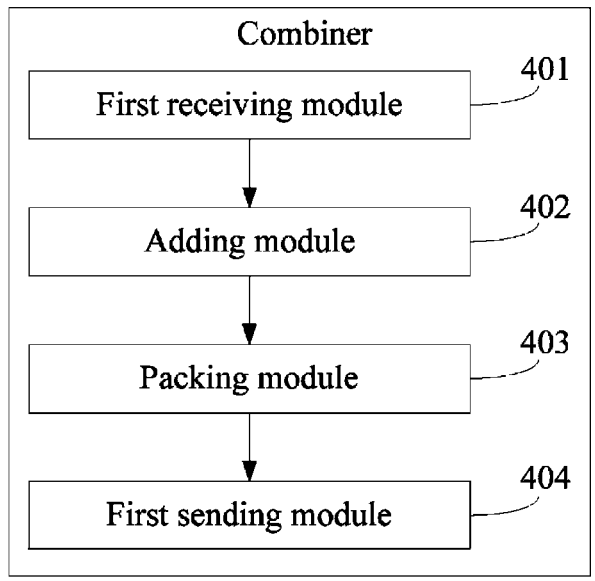
FIG. 4 is a schematic structural diagram of a first combiner according to yet another embodiment of the present invention.

The embodiment provides a combiner, where the combiner is configured to implement the methods for transmitting signals according to Embodiment 1 and Embodiment 2. Referring to FIG. 4, the combiner includes:
  a first receiving module 401, configured to receive antenna interface standards group AISG protocol signals sent by one or more local devices;
  an adding module 402, configured to add corresponding labels to the AISG protocol signals received by the first receiving module 401, the labels identifying mapping relationships between the local devices that send the AISG protocol signals and peer devices;
  a packing module 403, configured to pack the AISG protocol signals to which the labels are added by the adding module 402 into a data packet; and
  a first sending module 404, configured to send the data packet derived from packing by the packing module 403 to a peer combiner through a shared feeder, the peer combiner unpacking the data packet and sending the AISG protocol signals to corresponding peer devices according to the labels added to the AISG protocol signals.

Figure 5:
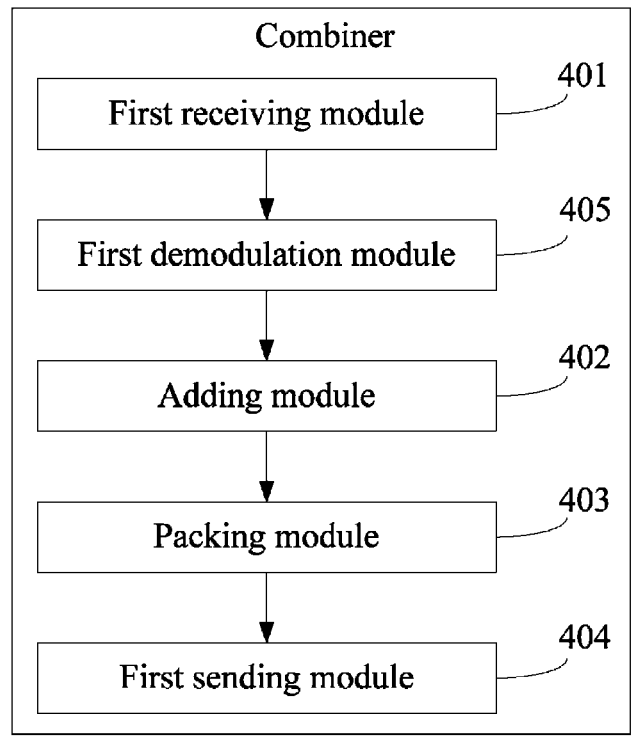
FIG. 5 is a schematic structural diagram of a second combiner according to the embodiment of FIG. 4.

Referring to FIG. 5, the combiner further includes:
  a first demodulation module 405, configured to demodulate the AISG protocol signals sent by one or more local devices and received by the first receiving module 401 to obtain AISG protocol signals after demodulation, before the adding module 402 adds corresponding labels to the AISG protocol signals.

The adding module 402 is configured to add corresponding labels to the demodulated AISG protocol signals obtained by the first demodulation module 405.

Figure 6:
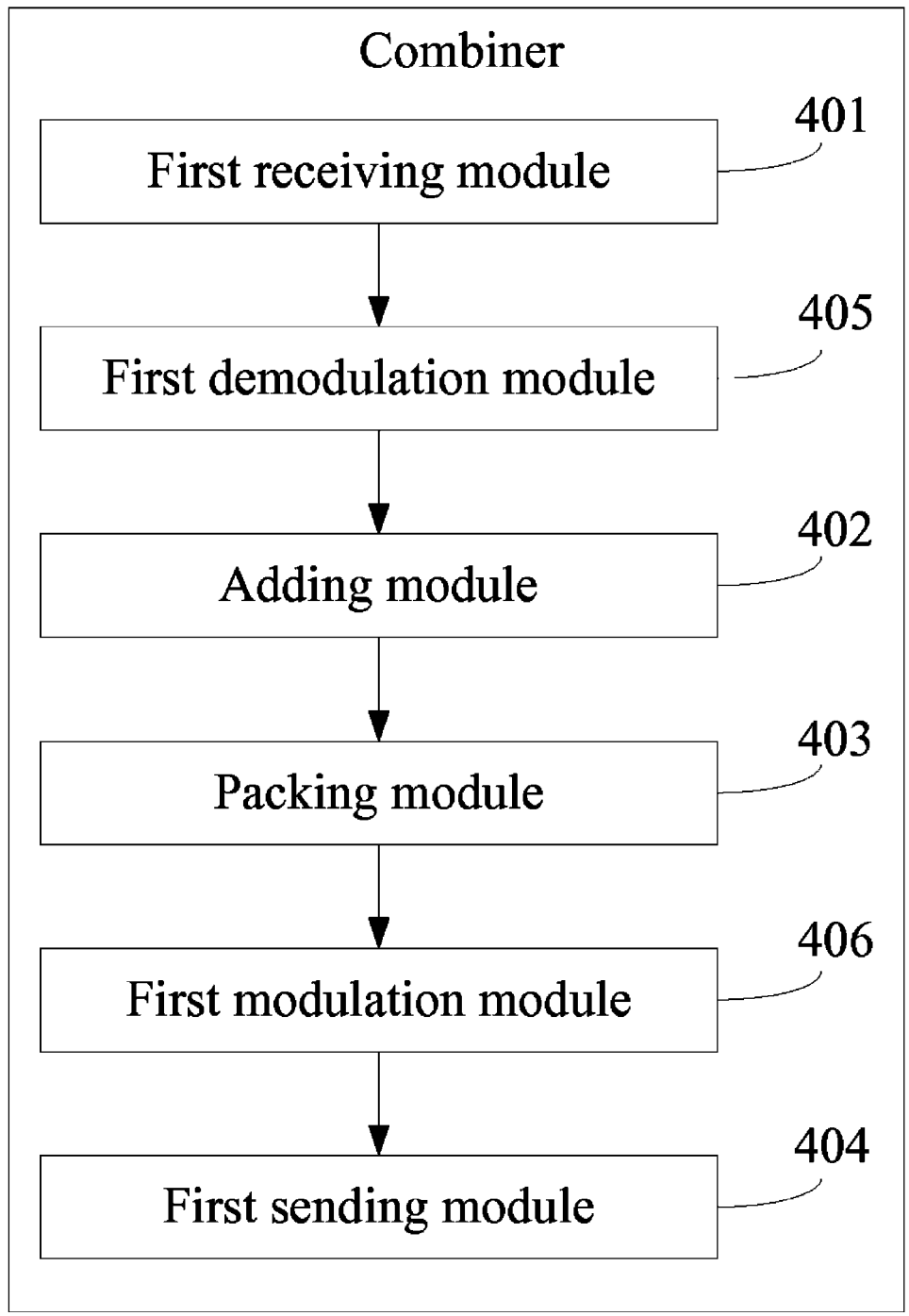
FIG. 6 is a schematic structural diagram of a third combiner according to the embodiment of FIG. 4.

Referring to FIG. 6, the combiner further includes:
  a first modulation module 406, configured to modulate the data packet to obtain a modulated data packet before the first sending module 404 sends the data packet to the peer combiner through the shared feeder.

The first sending module 404 is configured to send the modulated data packet obtained by the first modulation module 406 to the peer combiner through the shared feeder.

Figure 7:
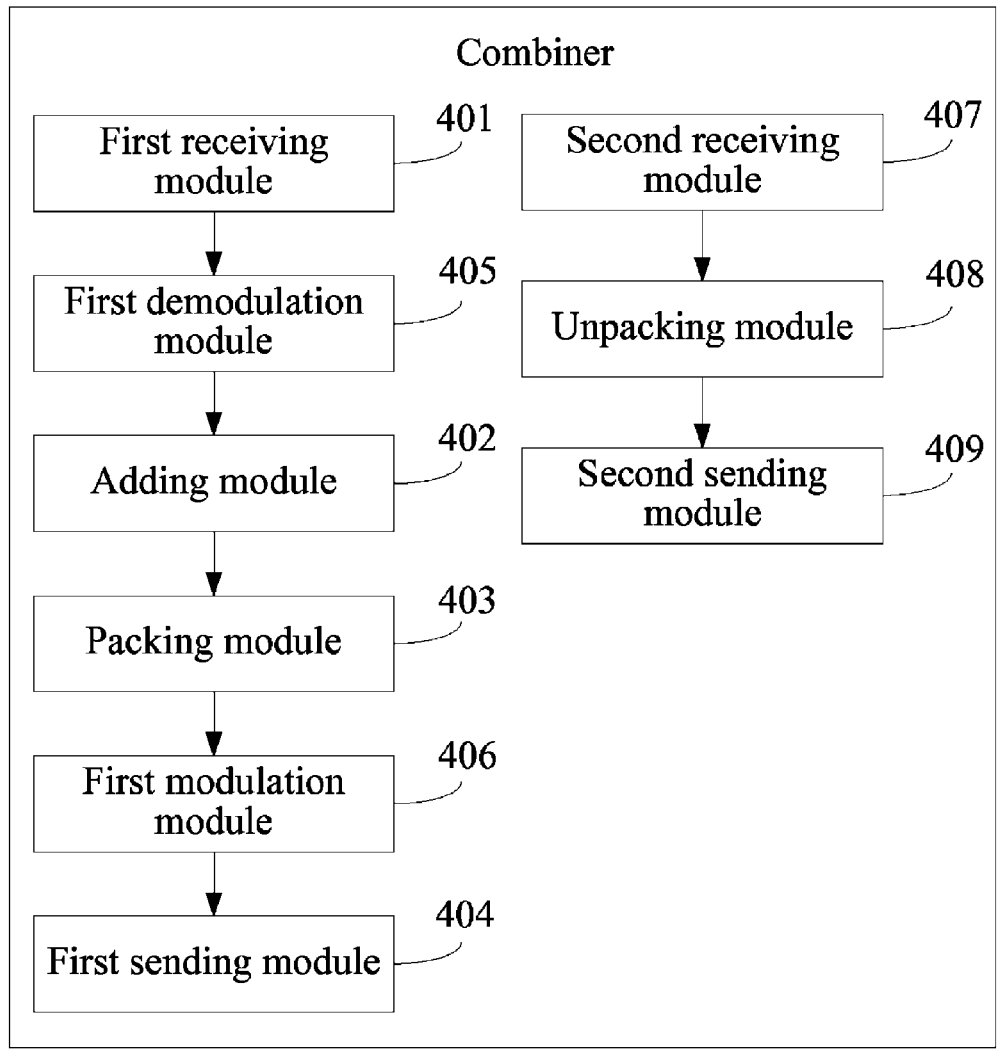
FIG. 7 is a schematic structural diagram of a fourth combiner according to the embodiment of FIG. 4 of the present invention.

Referring to FIG. 7, the combiner further includes:
  a second receiving module 407, configured to receive a data packet sent by the peer combiner, where the data packet carries the AISG protocol signals to which the labels are added, and the labels are used to the identify mapping relationships between the peer devices that send the AISG protocol signals and the local devices;
  an unpacking module 408, configured to unpack the data packet received by the second receiving module 407 to obtain the AISG protocol signals to which the labels are added; and
  a second sending module 409, configured to send the AISG protocol signals obtained by the unpacking module 408 to corresponding local devices according to the labels added to the AISG protocol signals.

Figure 8:
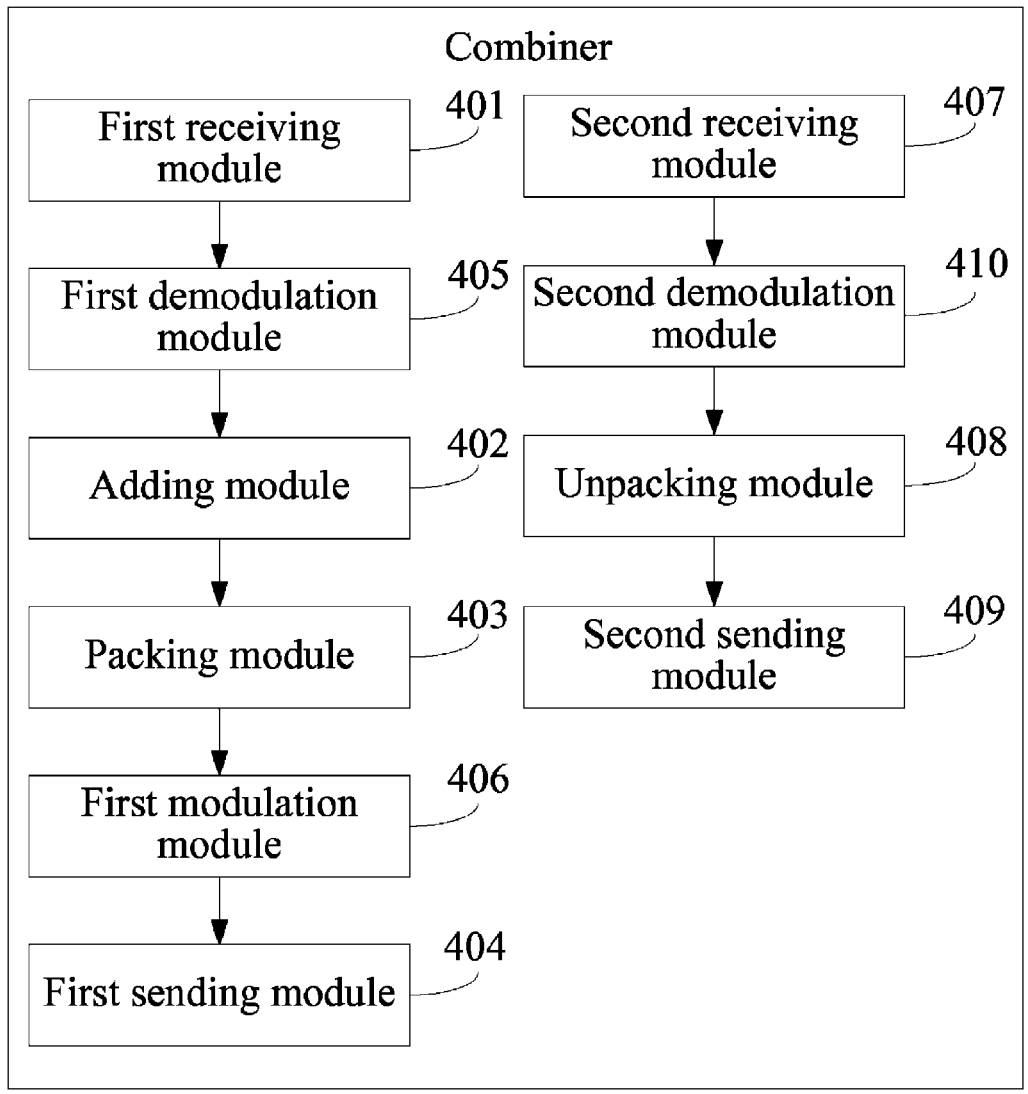
FIG. 8 is a schematic structural diagram of a fifth combiner according to the embodiment of FIG. 4.

Referring to FIG. 8, the combiner can further include:
  a second demodulation module 410, configured to demodulate the data packet received by the second receiving module 409 to obtain a demodulated data packet, before the unpacking module 408 unpacks the received data packet.

Correspondingly, the unpacking module 408 is specifically configured to unpack the demodulated data packet obtained by the second demodulation module 410 to obtain the AISG protocol signals to which the labels are added.

Figure 9:
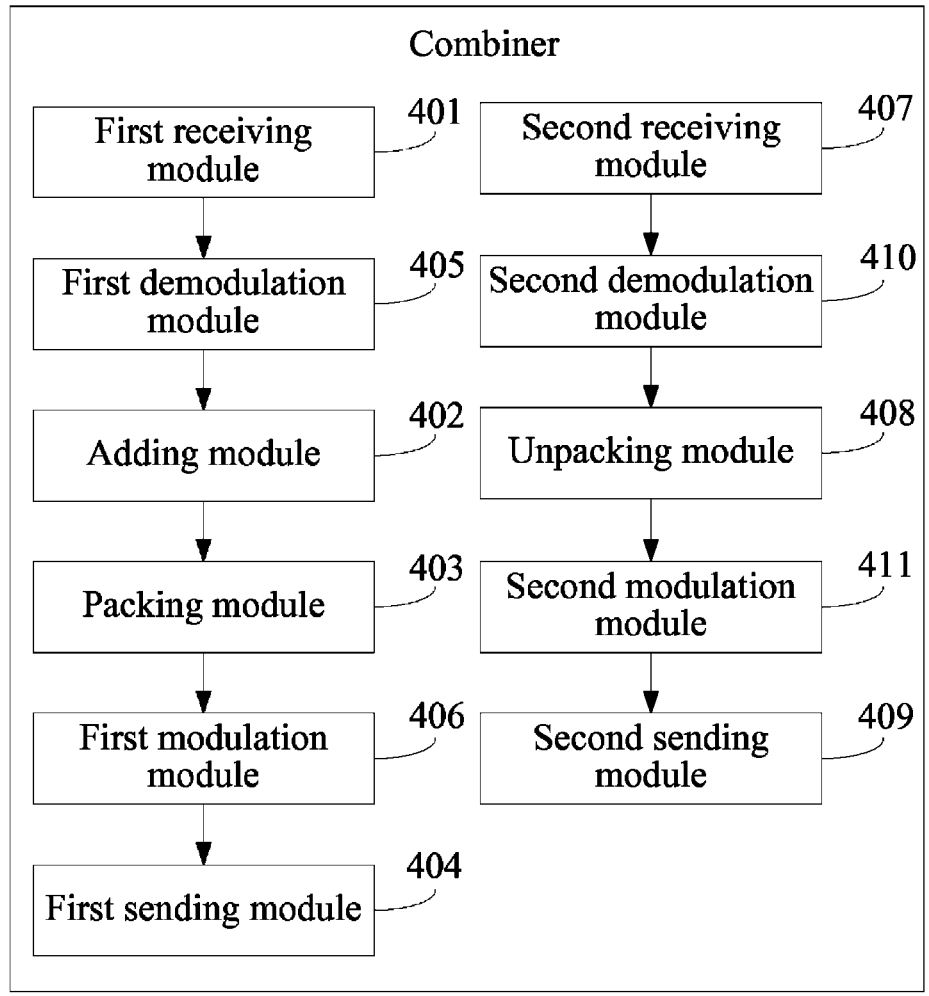
FIG. 9 is a schematic structural diagram of a sixth combiner according to the embodiment of FIG. 4.

Referring to FIG. 9, the combiner further includes:
  a second modulation module 411, configured to modulate the AISG protocol signals to which the labels are added to obtain modulated AISG protocol signals, before the second sending module 409 sends the AISG protocol signals to the corresponding local devices according to the labels added to the AISG protocol signals.

The second sending module 409 is configured to send the modulated AISG protocol signals obtained by the second modulation module 411 to the corresponding local devices according to the labels added to the AISG protocol signals.

For the combiner according to the embodiment, corresponding labels are added to received AISG protocol signals sent by one or more local devices, and the AISG protocol signals are sent to a peer combiner through a shared feeder. Because the labels added to the AISG protocol signals are used to identify mapping relationships between the local devices that send the AISG protocol signals and peer devices, the peer combiner is enabled to send the AISG protocol signals to corresponding peer devices according to the labels added to the AISG protocol signals, so that the feeder cost can be reduced and the efficiency of transmitting the AISG protocol signals can be improved.

Embodiment 4

Figure 10:
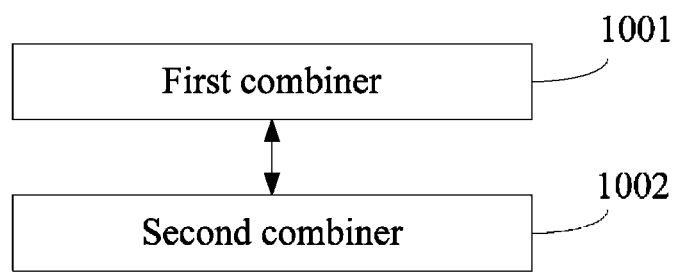
FIG. 10 is a schematic structural diagram of a system for transmitting signals according to a further embodiment of the present invention.

The embodiment provides a system for transmitting signals. Referring to FIG. 10, the system includes: a first combiner 1001 and a second combiner 1002.

The first combiner 1001 is configured to receive AISG protocol signals sent by one or more local devices and add corresponding labels to the AISG protocol signals, where the labels are used to identify mapping relationships between the local devices that send the AISG protocol signals and peer devices; pack the AISG protocol signals to which the labels are added into a data packet and send the data packet through a shared feeder.

The second combiner 1002 is configured to receive and unpack the data packet, and send the AISG protocol signals to corresponding peer devices according to the labels added to the AISG protocol signals.

Both the first combiner 1001 and the second combiner 1002 may have the functions of the combiner according to Embodiment 3. Accordingly, details are not repeated below, and the embodiment is not limited to such an arrangement.

For the system according to this embodiment, corresponding labels are added to AISG protocol signals sent by one or more local devices and received by a first combiner, and the AISG protocol signals are sent to a second combiner through a shared feeder. Because the labels added to the AISG protocol signals are used to identify mapping relationships between the local devices that send the AISG protocol signals and peer devices, the second combiner is enabled to send the AISG protocol signals to corresponding peer devices according to the labels added to the AISG protocol signals, so that the feeder cost can be reduced and the efficiency of transmitting the AISG protocol signals can be improved.

It should be noted that, when the combiner provided by the embodiment transmits AISG protocol signals, the foregoing division of the functional modules is only taken as an example for illustration. In the practical application, the foregoing functions may be distributed to different functional modules and completed by different functional modules as required. That is, the internal structure of the combiner may be divided into different functional modules to complete all or a part of functions described previously. In addition, the combiner, the system for transmitting signals and the method for transmitting signals according to the foregoing embodiments are all aspects of the disclosed embodiments. For the specific implementation, reference can be made to the method embodiment, and details are not repeated herein.

The sequential listing of the embodiments of the present information are for description only, and should not stand for any preference of the embodiments.

A part of the steps according to the embodiments of the present invention may be implemented by software, and the corresponding software program may be stored in a computer readable storage medium such as an optical disk or a hard disk.

The above description is merely about exemplary embodiments of the present invention, but not intended to limit the present invention. Any modifications, equivalent replacements, or improvements made without departing from the spirit and the principle of the present invention should fall within the protection scope of the present invention.

What is claimed is:

1. A method for transmitting signals, comprising:

receiving, by a combiner, antenna interface standards group (AISG) protocol signals sent by one or more local devices and adding, by the combiner, corresponding labels to the AISG protocol signals sent by the local devices, the labels identifying mapping relationships between the local devices that send the AISG protocol signals and peer devices;

packing, by the combiner, the AISG protocol signals, sent by the local devices and to which the labels are added, into a first data packet;

sending, by the combiner, the first data packet to a peer combiner through a shared feeder, the peer combiner unpacking the first data packet and sending the AISG protocol signals sent by the local devices to corresponding peer devices according to the added labels;

receiving, by the combiner, a second data packet sent by the peer combiner, wherein the second data packet carries AISG protocol signals sent by the peer devices to which labels are added that identify mapping relationships between the peer devices that send the AISG protocol signals and the local devices;

unpacking, by the combiner, the received second data packet to obtain the AISG protocol signals sent by the peer devices; and sending, by the combiner, the AISG protocol signals sent by the peer devices to corresponding local devices according to the added labels.

2. The method according to claim 1, the method further comprising:

demodulating, by the combiner, the received AISG protocol signals sent by the one or more local devices to obtain demodulated AISG protocol signals;

wherein adding the corresponding labels to the AISG protocol signals sent by the local devices comprises:

adding, by the combiner, the corresponding labels to the demodulated AISG protocol signals.

3. The method according to claim 2, wherein the demodulating the received AISG protocol to obtain demodulated AISG protocol signals is performed prior to the adding the corresponding labels to the ASIG protocol signals sent by the local devices.

4. The method according to claim 1, the method further comprising:

modulating, by the combiner, the first data packet to obtain a modulated data packet; wherein sending the first data packet to the peer combiner through the shared feeder comprises:

sending, by the combiner, the modulated data packet to the peer combiner through the shared feeder.

5. The method according to claim 4, wherein the modulating the first data packet to obtain a modulated data packet is performed prior to the sending the first data packet to the peer combiner.

6. The method according to claim 1, the method further comprising:
  demodulating, by the combiner, the received second data packet to obtain a demodulated data packet;
  wherein unpacking the received second data packet comprises:
  unpacking, by the combiner, the demodulated data packet to obtain the AISG protocol signals sent by the peer devices to which the labels are added.

7. The method according to claim 6, wherein the demodulating the received second data packet to obtain a demodulated data packet is performed prior to the unpacking the received second data packet to obtain the AISG protocol signals.

8. The method according to claim 1, the method further comprising:
  modulating, by the combiner, the AISG protocol signals sent by the peer devices to which the labels are added to obtain modulated AISG protocol signals;
  wherein sending the AISG protocol signals sent by the peer devices to the corresponding local devices according to the added labels comprises:
  sending, by the combiner, the modulated AISG protocol signals to the corresponding local devices according to the added labels.

9. The method according to claim 8, wherein the modulating the AISG protocol signals sent by the peer devices to obtain modulated AISG protocol signals is performed prior to the sending the AISG protocol signals sent by the peer devices to the corresponding local devices.

10. A combiner, comprising:
  a first receiving module, configured to receive antenna interface standards group (AISG) protocol signals sent by one or more local devices;
  an adding module, configured to add corresponding labels to the AISG protocol signals sent by the local devices received by the first receiving module, the labels identifying mapping relationships between the local devices that send the AISG protocol signals and peer devices;
  a packing module, configured to pack the AISG protocol signals sent by the local devices to which the labels are added by the adding module into a first data packet;
  a first sending module, configured to send the first data packet derived from packing by the packing module to a peer combiner through a shared feeder, the peer combiner unpacking the first data packet and sending the AISG protocol signals sent by the local devices to corresponding peer devices according to the added labels;
  a second receiving module, configured to receive a second data packet sent by the peer combiner, wherein the second data packet carries AISG protocol signals sent by the peer devices to which labels are added that identify mapping relationships between the peer devices that send the AISG protocol signals and the local device;
  an unpacking module, configured to unpack the second data packet received by the second receiving module to obtain the AISG protocol signals sent by the peer devices; and
  a second sending module, configured to send the AISG protocol signals sent by the peer devices obtained by the unpacking module to corresponding local devices according to the added labels.

11. The combiner according to claim 10, further comprising:
  a first demodulation module, configured to demodulate the AISG protocol signals sent by the one or more local devices and received by the first receiving module to obtain demodulated AISG protocol signals;
  wherein the adding module is configured to add the corresponding labels to the demodulated AISG protocol signals obtained by the first demodulation module.

12. The combiner according to claim 11, wherein the first demodulation module is configured to demodulate the AISG protocol signals to obtain demodulated AISG protocol signals before the adding module adds the corresponding labels to the AISG protocol signals sent by the local devices.

13. The combiner according to claim 10, further comprising;
  a first modulation module, configured to modulate the first data packet to obtain a modulated data packet;
  wherein the first sending module is configured to send the modulated data packet obtained by the first modulation module to the peer combiner through the shared feeder.

14. The combiner according to claim 13, wherein the first modulation module is configured to modulate the first data packet to obtain a modulated data packet before the first sending module sends the first data packet to the peer combiner.

15. The combiner according to claim 10, further comprising:
  a second demodulation module, configured to demodulate the second data packet received by the second receiving module to obtain a demodulated data packet;
  wherein the unpacking module is configured to unpack the demodulated data packet obtained by the second demodulation module to obtain the AISG protocol signals sent by the peer devices to which the labels are added.

16. The combiner according to claim 15, wherein the second demodulation module is configured to demodulate the second data packet to obtain a demodulated data packet before the unpacking module unpacks the received second data packet.

17. The combiner according to claim 10, further comprising:
  a second modulation module, configured to modulate the AISG protocol signals sent by the peer devices to which the labels are added to obtain modulated AISG protocol signals;
  wherein the second sending module is configured to send the modulated AISG protocol signals obtained by the second modulation module to the corresponding local devices according to the added labels.

18. The combiner according to claim 17, wherein the second modulation module is configured to modulate the AISG protocol signals sent by the peer devices to obtain modulated AISG protocol signals before the second sending module sends the AISG protocol signals sent by the peer devices to the corresponding local devices.

19. A system for transmitting signals, the system including a first combiner and a second combiner, wherein:
  the first combiner is configured to receive antenna interface standards group (AISG) protocol signals sent by one or more local devices, add corresponding labels to the AISG protocol signals sent by the local devices, the labels identifying mapping relationships between the local devices that send the AISG protocol signals and peer devices, pack the AISG protocol signals sent by the local devices to which the labels are added into a first data packet, send the data packet through a shared feeder; and
  the second combiner is configured to receive and unpack the first data packet, and send the AISG protocol signals sent by the local devices to corresponding peer devices according to the added labels;

wherein the first combiner is further configured to receive a second data packet sent by the second combiner, wherein the second data packet carries AISG protocol signals sent by the peer devices to which labels are added that identify mapping relationships between the peer devices that send the AISG protocol signals and the local device, unpack the second data packet to obtain the AISG protocol signals sent by the peer devices, send the AISG protocol signals sent by the peer devices to corresponding local devices according to the added labels.

* * * * *